United States Patent
Rippel et al.

(10) Patent No.: US 10,210,479 B2
(45) Date of Patent: Feb. 19, 2019

(54) COMPUTERIZED SYSEM AND METHOD FOR DATA ACQUISTION AND APPLICATION OF DISPARATE DATA TO TWO STAGE BAYESIAN NETWORKS TO GENERATE CENTRALLY MAINTAINED PORTABLE DRIVING SCORE DATA

(75) Inventors: Steven P. Rippel, Newington, CT (US); James T. Birchall, Southwick, MA (US); John A. Hess, III, Guilford, CT (US); Brad Robert Fresher, Farmington, CT (US); Mark Philip Shipman, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1584 days.

(21) Appl. No.: 12/181,463

(22) Filed: Jul. 29, 2008

(65) Prior Publication Data
US 2010/0030582 A1    Feb. 4, 2010

(51) Int. Cl.
*G06Q 10/10* (2012.01)
*G06Q 40/08* (2012.01)

(52) U.S. Cl.
CPC .............. *G06Q 10/10* (2013.01); *G06Q 40/08* (2013.01)

(58) Field of Classification Search
CPC ...................................................... G06Q 40/08
USPC ............................................................. 705/4
See application file for complete search history.

(56) References Cited

U.S. PATENT DOCUMENTS

| | | |
|---|---|---|
| 5,704,017 A | 12/1997 | Heckerman et al. |
| 5,802,256 A | 9/1998 | Heckerman et al. |
| 5,978,729 A | 11/1999 | Landes et al. |
| 6,408,290 B1 | 6/2002 | Thiesson et al. |
| 6,480,832 B2 | 11/2002 | Nakisa |
| 6,529,888 B1 | 3/2003 | Heckerman et al. |
| 6,807,537 B1 | 10/2004 | Thiesson et al. |
| 7,072,841 B1 | 7/2006 | Pednault |

(Continued)

OTHER PUBLICATIONS

Duncan Anderson et al., "A Practitioner's Guide to Generalized Linear Models", A foundation for theory, interpretation and application, Third edition—Feb. 2007, Watson Wyatt Worldwide, (pp. 3-115 + cover 2pgs + introduction 1pg + contents 1pg + back cover 1pg, total 118 pages).

(Continued)

*Primary Examiner* — Robert R Niquette
*Assistant Examiner* — Liz P Nguyen
(74) *Attorney, Agent, or Firm* — Howard IP Law Group

(57) ABSTRACT

A method for underwriting an insurance policy includes sending an electronic query from an insurance company to a central vehicle operator rating agency. The method further includes receiving at the insurance company an electronic response to the query from the central vehicle operator rating agency. The response includes data maintained by the central vehicle operator rating agency with respect to a vehicle operator. The data reflects a vehicle operating record of the vehicle operator. The vehicle operating record is a collation of data concerning vehicle operation activities of the vehicle operator over a period of at least two years. The method further includes routing the received data to an underwriter in the insurance company. The underwriter determines whether to issue or renew or adjust an insurance policy that covers the vehicle operator or an employer of the vehicle operator.

19 Claims, 10 Drawing Sheets

(56) References Cited

U.S. PATENT DOCUMENTS

| | | |
|---|---|---|
| 7,130,777 B2 | 10/2006 | Garg et al. |
| 7,720,779 B1 | 5/2010 | Perry et al. |
| 7,831,451 B1 * | 11/2010 | Morse et al. ............... 705/4 |
| 8,041,632 B1 * | 10/2011 | Coleman ............ G06Q 30/0202 |
| | | 705/38 |
| 8,086,523 B1 * | 12/2011 | Palmer ................ G06Q 40/025 |
| | | 705/38 |
| 2002/0173885 A1 | 11/2002 | Lowrey et al. |
| 2005/0071217 A1 * | 3/2005 | Hoogs et al. ............... 705/10 |
| 2006/0015377 A1 * | 1/2006 | Hoogs et al. ............... 705/7 |
| 2006/0053038 A1 | 3/2006 | Warren et al. |
| 2006/0253307 A1 * | 11/2006 | Warren et al. ............... 705/4 |
| 2007/0027726 A1 | 2/2007 | Warren et al. |
| 2007/0257815 A1 | 11/2007 | Gunderson et al. |
| 2008/0065427 A1 | 3/2008 | Helitzer et al. |
| 2008/0262877 A1 * | 10/2008 | Hargroder ............... 705/4 |
| 2009/0024419 A1 * | 1/2009 | McClellan et al. ............... 705/4 |
| 2009/0132294 A1 * | 5/2009 | Haines ............... 705/4 |
| 2009/0224941 A1 | 9/2009 | Kansal et al. |
| 2009/0284361 A1 | 11/2009 | Boddie et al. |
| 2009/0287369 A1 | 11/2009 | Nielsen |

OTHER PUBLICATIONS

Spirtes, et al., "Causation, Prediction, and Search", The MIT Press, Copyright 2000, The Massachusetts Institute of Technology, Chapter 6 ( pp. 123-155 and cover 3 pages, total 35 pages).

\* cited by examiner

Comprehensive Commercial Driving Score: June 18, 2008

Jim Doe, 1313 Mockingbird Lane, Summit, NJ, 89890
Social Security Number 043-34-XXXX.
Next previous address: 2343 Ventures Way, Anaheim, California 06079

902 → Overall Score: 211.6

This comprehensive driving score has been calculated using a combination of sources; Telematics device in a vehicle, Department of Motor Vehicle and one or all of the major credit bureau's. Score is calculated monthly using all data available. Last activity: May 2007, change of employment Category and score for Jim Doe:

| | |
|---|---|
| Safety: 109.5 | Industry Average: 110 |
| Maintenance: 45 | Industry Average: 50 |
| Efficiency: 36.6 | Industry Average: 50 |
| Driver profile: 21.5 | Industry Average: 30 |
| Overall Score: 211.6 | Industry Average: 275 |

*Industry Average based on years of experience

906 — Safety
908 — Maintenance
910 — Efficiency
912 — Driver profile
904 — Overall Score

Employment History:

1980-1990: Casey and Hayes Moving, Bloomfield, Ct.
Primary role: Truck driver, local, GVW less than 40,000
1990-1995: Hayes Cement Company, Waterbury, Ct.
Primary role: Truck driver, local, GVW 40,000 to 80,000
1995-2000: Wal-Mart Stores, national, GVW > 80,000
Primary role: long haul trucking, dry goods
2000-May 2008: Paine Garbage Company, Simsbury, Conn.
Primary role: short haul trucking, GVW < 40,000
May 2008 - present: Nationwide Moving and Storage, Maryland.
Primary role: long haul trucking, GVW > 80,000

Formal Training:

- Birchall Driving Academy 1980, 1 year training
- 3D Driving School, The Hartford 2005, 1 week class Department of Motor Vehicle Report:
1) Maryland, speeding over 70 in 55
2) Connecticut, accident, at fault, no injuries

FIG. 9

COMPUTERIZED SYSEM AND METHOD FOR DATA ACQUISTION AND APPLICATION OF DISPARATE DATA TO TWO STAGE BAYESIAN NETWORKS TO GENERATE CENTRALLY MAINTAINED PORTABLE DRIVING SCORE DATA

FIELD

The present invention relates to insurance underwriting practices that rely on computerized data storage systems.

BACKGROUND

Underwriting of insurance policies for individual motor vehicles and for vehicle fleets involves the application of certain statistical methods as well as the underwriters' judgment and experience to make the underwriting decisions. The data considered in an underwriting decision may include an individual's record of accidents and moving violations and demographic factors. A company's loss experience, fleet characteristics and type of business activities may come into play for fleet underwriting determinations.

The present inventors have recognized a need for a national and international centralized driver/operator rating agency that formulates and disseminates an industry recognized, portable score for drivers based on multiple data points.

SUMMARY

An apparatus, method, computer system and computer-readable data storage medium are disclosed which include sending an electronic query from an insurance company to a central vehicle operator rating agency, and receiving at the insurance company an electronic response to the query from the central vehicle operator rating agency. The response includes data maintained by the central vehicle operator rating agency with respect to a vehicle operator. The data reflects a vehicle operating record of the vehicle operator. The vehicle operating record is a collation of data concerning vehicle operation activities of the vehicle operator over a period of at least two years. The apparatus, method, computer system and computer-readable data storage medium also include routing the received data to an underwriter in the insurance company. The underwriter determines whether to issue or renew or adjust an insurance policy that covers the vehicle operator or an employer of the vehicle operator.

The underwriter may be a human employee of the insurance company or may be a computer program operated by the insurance company to automatically make or recommend underwriting decisions. The data maintained by the central vehicle operator rating agency may include a comprehensive driver score for the vehicle operator.

In a further aspect, an apparatus, method, computer system and computer-readable data storage medium are disclosed which include sending an electronic query to a central vehicle operator rating agency, and receiving an electronic response to the query from the central vehicle operator rating agency. The response includes data maintained by the central vehicle operator rating agency with respect to a vehicle operator. The data reflects a vehicle operating record of the vehicle operator. The vehicle operating record is a collation of data concerning vehicle operation activities of the vehicle operator over a period of at least two years.

In another aspect, an apparatus, method, computer system and computer-readable data storage medium are disclosed which include receiving or generating a first indicia indicative of a driver's driving practices, receiving a second indicia indicative of the driver's financial condition, receiving information concerning department of motor vehicles (DMV) records for the driver, generating a score for the driver from the DMV records, combining the first and second indicia and the score generated from DMV records to generate the combined score for the driver, and storing the combined score for the driver in a computerized database.

The first indicia may include or take the form of a score indicative of the driver's driving practices. The second indicia may include or take the form of a credit score for the driver.

In yet another aspect, there is disclosed a computer-readable data storage device that stores a database. The database includes vehicle operation information concerning a plurality of vehicle operators. The vehicle operation information includes a respective vehicle operator score for each of the vehicle operators. The respective vehicle operator score reflects a vehicle operating record of the vehicle operator in question. The vehicle operating record is a collation of data concerning vehicle operation activities of the vehicle operator over a period of at least two years.

One or more of these computer-implemented systems or methods or devices may allow for a comprehensive, nationally recognized driver score to be assigned and maintained by a central driver rating agency. Among other factors, the driver scores may reflect driving behaviors detected by automatic sensors installed in commercial vehicles with the sensor data collected via automatic vehicle tracking systems ("telematics"). This score may be "portable" by professional drivers from job to job and may constitute a professional credential for the drivers. Insurance companies may use the driver scores in making underwriting decisions, and fleet operators may base driver hiring and retention decisions on driver scores. Consequently, the driver score described herein may constitute a new type of data, and a distillation of information, useful for insurance underwriting and loss prevention.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 9 is an example screen display or printout that may be provided by the central driver rating agency.

DETAILED DESCRIPTION

In general, and for the purposes of introducing concepts of embodiments of the present invention, a central driver rating agency generates, stores and disseminates comprehensive driver scores for professional drivers. One input to the driver scoring process may include driving behavior data gathered over time via sensors in vehicles and via telematics systems. The driver score may be a professional credential for drivers and may be used for insurance underwriting purposes and in connection with loss prevention and hiring by vehicle fleet operators. For example, insurance companies may query the central driver rating agency for drivers' scores in connection with underwriting decisions with respect to individual professional truck owner-operators. In addition or alternatively, insurance companies may employ the driver score profiles for driver-employees of fleet operators in determining how or whether to underwrite insurance for vehicle fleets.

Figure 1:
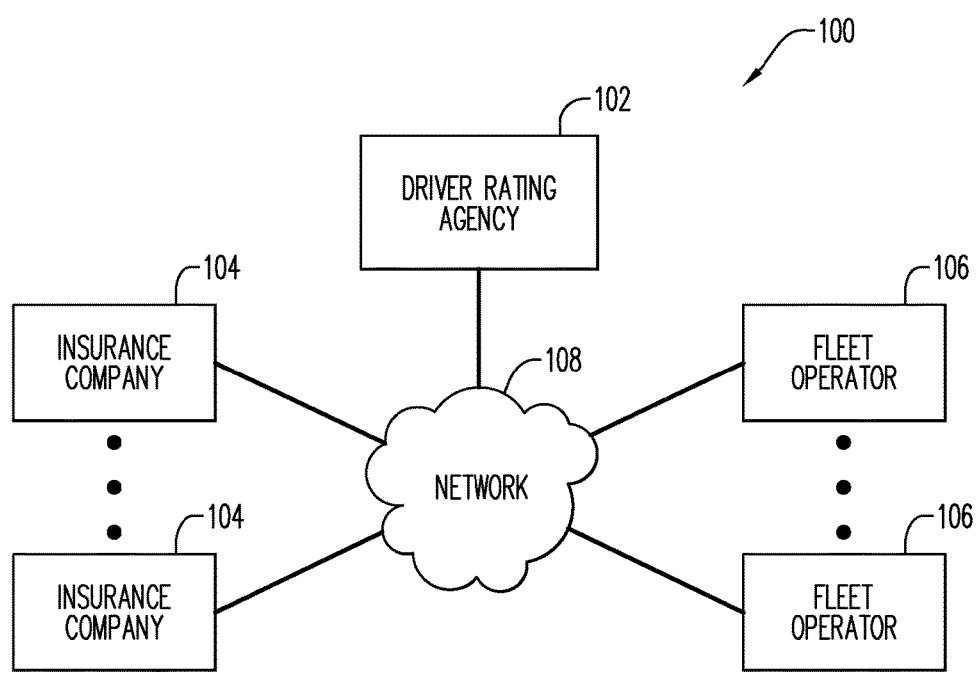
FIG. 1 is a block diagram of a system provided according to aspects of the present invention.

FIG. 1 is a block diagram of a system 100 provided according to aspects of the present invention. The system 100 includes a central driver rating agency 102. Operation of the central driver rating agency 102 will be described below. The system 100 further includes insurance companies 104 and vehicle fleet operators 106. The insurance companies write insurance policies that cover individual motor vehicles and/or fleets of vehicles. The fleet operators may be motor freight companies, or organizations that own and operate motor vehicles for other purposes, such as parcel delivery, bus transportation, limousines, taxis, etc, and may also include owners of boats and ships, heavy construction and/or earth moving equipment, aircraft, and so forth.

The insurance companies 104 and the vehicle fleet operators 106 may communicate with the central driver rating agency 102 via a data network 108. More specifically, the insurance companies 104 and vehicle fleet operators 106 may request and receive driver scores from the central driver rating agency 102. (The data network 108 may be a public network, a private network, or a combination of public and private networks. It is also contemplated that individual drivers may operate computers (not shown) to request their driver score from the central driver rating agency 102, potentially on a fee for service basis.)

Figure 2:
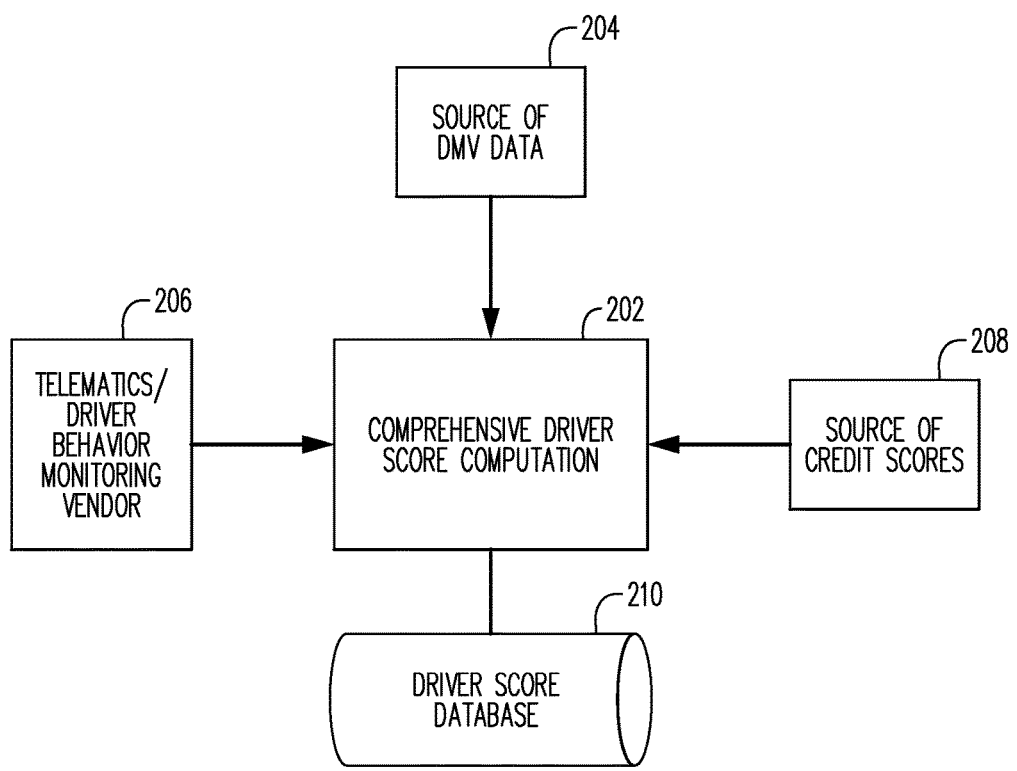
FIG. 2 illustrates data flows involved in generating a comprehensive driver score in accordance with aspects of the present invention.

FIG. 2 illustrates data flows involved in the calculation of the driver scores by the central driver rating agency 102. The comprehensive driver score calculation, indicated at 202 in FIG. 2, may in some embodiments be derived from three types of data: (1) Information available as public records from state Departments of Motor Vehicles (block 204); (2) information provided from a vendor (block 206) of telematics and driver behavior monitoring services; (3) a source (block 208) of data about the drivers' financial condition.

In some embodiments, only two of the three listed sources of data may be used. For example, the driver score may be calculated in some embodiments without utilizing credit scores. In some embodiments, the central driver rating agency 102 may calculate two driver scores for each driver that it rates—one score that utilizes the driver financial condition data and another score that does not utilize the driver financial condition data. The latter type of score may be used in regulatory environments that disfavor use of credit scores for insurance underwriting activities. In some embodiments, the rating agency 102 may offer both an overall score for a driver and one or more subscores that each reflect a subset of the driver's driving record.

The source 208 of financial condition data may, for example, be any one of the well-known national credit bureaus. The data provided by the source 208 may include or consist of one or more credit scores.

The DMV information provided by source 204 may reflect state DMV records of moving violation convictions. In some embodiments, this information may be supplemented by data that reflects accidents in which the drivers were involved, and/or accidents in which the drivers were found to be at fault. The accident data may be provided by insurance companies or a consortium of insurance companies.

The telematics/driver behavior monitoring vendor 206 may provide information that is based on detection of location and/or movements of the vehicles. It may be a requirement for obtaining and maintaining a driver score that the driver in question operate a vehicle that is equipped with suitable telematics devices, monitored by the telematics/driver behavior monitoring vendor 206. For example, each driver who wishes to have a driver score may drive a vehicle equipped with a conventional GPS device that transmits the vehicle's location to the vendor on a regular basis. The telematics equipment in the vehicle may also include one or more accelerometers or other sensors that detect vehicle movement and/or maneuvering. For example, the sensors may be configured to detect and report to the telematics/driver behavior monitoring vendor 206 events such as cornering at excessive speed, hard braking, excessive acceleration, excessive vibration or jarring, speed in excess of an applicable speed limit, excessive speed on a downgrade, etc. The sensors or other telematics equipment may also provide data to the telematics/driver behavior monitoring vendor 206 concerning times and locations of operation of the vehicle, operation of the vehicle continuously in excess of applicable regulations with respect to rest periods, or other operations of the vehicle that may indicate potentially hazardous or relatively risky operation.

The telematics/driver behavior monitoring vendor 206 may use an algorithm to calculate a driver behavior score from the data monitored from the telematics equipment in the vehicle, including sensors, accelerometers, and the like. The algorithm may be of a type that is known to those who are skilled in the art. The algorithm may be applied automatically (by a computer that is not shown) to calculate the driver behavior score. In some embodiments, the driver behavior score may reflect operation of the driver's vehicle over a relatively limited time. Preferably, however, the driver behavior score may be based on a record of events or other driver behavior extending over a considerable portion of a driver's professional career, say over two, five or ten years or more. The telematics/driver behavior monitoring vendor 206 may adjust the driver behavior score over time to reflect recent events or detected driver behavior or to reflect that events or detected behaviors have receded into the past. The driver's knowledge that his/her behavior/maneuvering of the vehicle is subject to automatic detection, recording and scoring may motivate the driver to maintain safe vehicle maneuvering and driving habits.

In some embodiments, the telematics/driver behavior monitoring vendor 206 reports only driver behavior scores to the central driver rating agency 102 for use in calculation by the central driver rating agency 102 of a comprehensive driver score. In other embodiments, the telematics/driver behavior monitoring vendor 206 reports both driver behavior scores and at least some underlying data to the central driver rating agency 102. Alternatively, the telematics/driver behavior monitoring vendor 206 may report only raw or somewhat processed event and behavior data to the central driver rating agency 102, and the latter may perform all scoring.

The central driver rating agency 102 may generate a public record driving score for each driver from the DMV data received from the source 204. The scoring may be based on any suitable algorithm, including techniques akin to those employed by credit agencies. For example, the public record driving score algorithm may be based on a regression analysis of historical records that determines the likelihood that a driver will be involved in a vehicle accident based on certain patterns of DMV data for the driver. The public record driving score may, for example, be derived from information that extends over a considerable period of time, such as two or more years.

In some embodiments, the public record driving score may be calculated using Generalized Linear Models (GLM). GLM are generally described in a paper entitled "A Practitioner's Guide to Generalized Linear Models", authored by Duncan Anderson et al., and published by the Casualty Actuarial Society.

The central driver rating agency 102 may also generate a comprehensive driver score for each driver based on (1) the driver behavior score from the telematics/driver behavior monitoring vendor 206 for the driver, (2) the public record driving score calculated by the central driver rating agency 102 for the driver, and (3) the driver's credit score. For example, the central driver rating agency 102 may apply a respective weight to each of the three scores, and may add the weighted scores together to generate the comprehensive driver score as a combination of the three scores. In some embodiments, the weighting applied to the three scores may vary depending on the type of vehicle driven by the driver in question.

Also shown in FIG. 2 is a driver score database 210. The driver score database 210 may store the comprehensive driver scores calculated at 202 in association with identifying information for the drivers, such as the drivers' names and residential addresses. Other information that may be stored in the database 210 may include the type or types of vehicles that the drivers are licensed to drive. In some embodiments there may be more than one comprehensive driver score for a given driver if he/she is licensed to drive more than one type of commercial vehicle. For example, the driver may have one driver score applicable to his/her driving of tractor-trailers, and another driver score that is applicable to his/her driving of buses. The data in the driver score database may, for example, include standard driver data available from the Insurance Services Organization (ISO).

Figure 3:
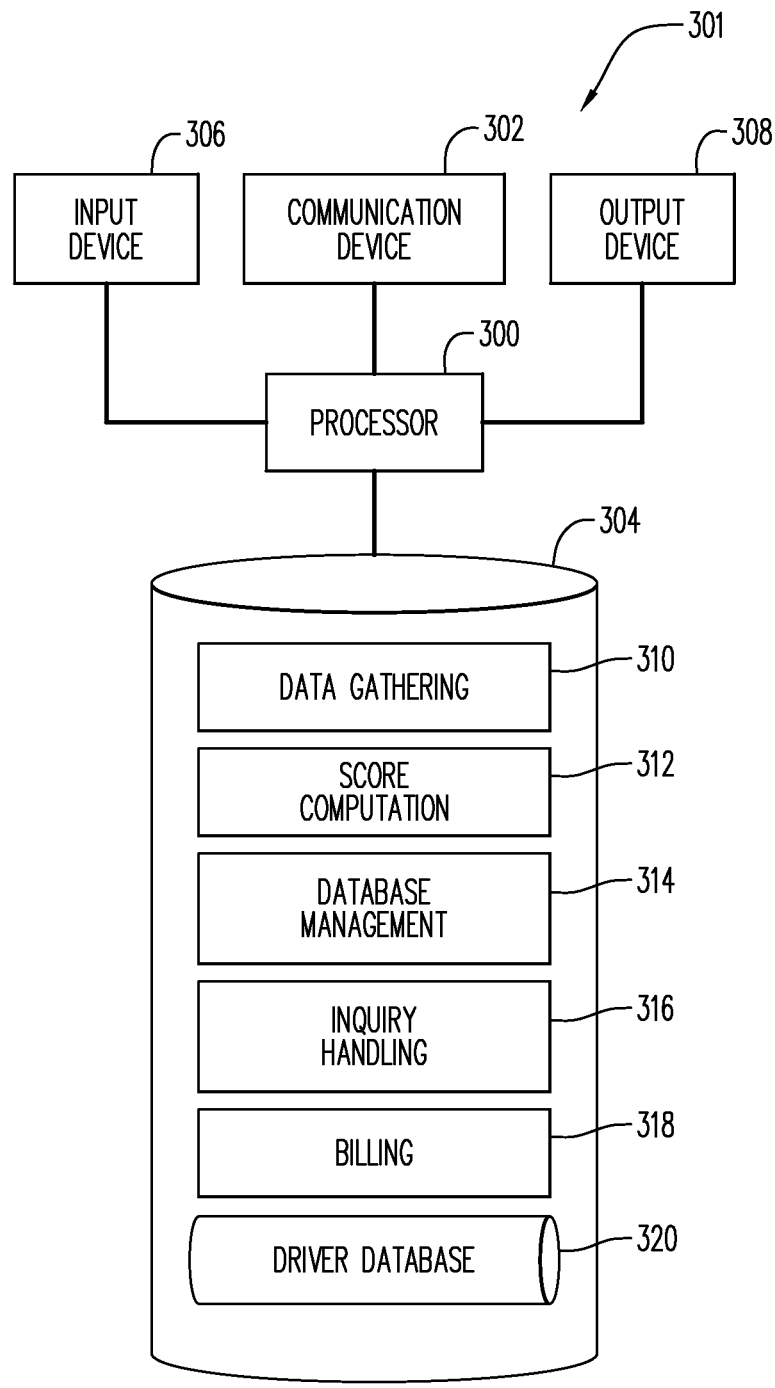
FIG. 3 is a block diagram representation of a computer that may embody aspects of the central driver rating agency shown in FIG. 1.

FIG. 3 is a block diagram representation of a computer 301 that may embody aspects of the central driver rating agency 102.

As depicted, the driver rating agency computer 301 includes a computer processor 300 operatively coupled to a communication device 302, a storage device 304, one or more input devices 306 and one or more output devices 308.

Communication device 302 may be used to facilitate communication with, for example, other devices (such as computers operated by the insurance companies 104 (FIG. 1) and the fleet operators 106). Continuing to refer to FIG. 3, the input device(s) 306 may comprise, for example, a keyboard, a keypad, a mouse or other pointing device, a microphone, knob or a switch, an infra-red (IR) port, a docking station, and/or a touch screen. The input device(s) 306 may be used, for example, to enter information. Output device(s) 308 may comprise, for example, a display (e.g., a display screen), a speaker, and/or a printer.

Storage device 304 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. At least some of these devices may be considered computer-readable storage media, or may include such media.

In some embodiments, the hardware aspects of the driver rating agency computer 301 may be entirely conventional.

Storage device 304 stores one or more programs or portions of programs (at least some of which being indicated by blocks 310-318) for controlling processor 300. Processor 300 performs instructions of the programs, and thereby operates in accordance with aspects of the present invention. In some embodiments, the programs may include a program or program module 310 that programs the driver rating agency computer 301 to receive, request and/or gather the data from the sources 204, 206, 208 shown in FIG. 2.

Another program or program module stored on the storage device 304 is indicated at block 312 and is operative to program the driver rating agency computer 301 to calculate one or more of the above-described comprehensive driver score, public record driving score and driver behavior score. Programs 310 and 312 are provided in accordance with aspects of the present invention.

Still another program stored on the storage device 304 is indicated at block 314. Program 314 may be a conventional database management program, and may be provided to allow the driver rating agency computer 301 to store and access the driver score database 210 (FIG. 2) and/or other databases stored in the storage device 304.

Continuing to refer to FIG. 3, storage device 304 also stores a program/program module 316, which operates to control the driver rating agency computer 301 to receive, handle and respond to requests from third parties (e.g., insurance companies and/or fleet operators) for the comprehensive driver scores or other scores or data stored in the database 210.

In addition, the storage device 304 may store a program/program module 318, which controls the driver rating agency computer 301 to perform billing activities. These activities may include, for example, billing third parties for subscriptions to the database 210 and/or for access to the database based on usage. The billing program 318 may also operate to process credit card charges, for example, from individual drivers who request a report on their comprehensive driver score.

There may also be stored in the storage device 304 other software, such as one or more conventional operating systems, device drivers, communications software, website hosting software, etc.

Still further, the storage device 304 may store the database 210 and one or more other databases used by the driver rating agency computer 301. Such databases are illustrated in FIG. 3 as block 320.

Figure 4:
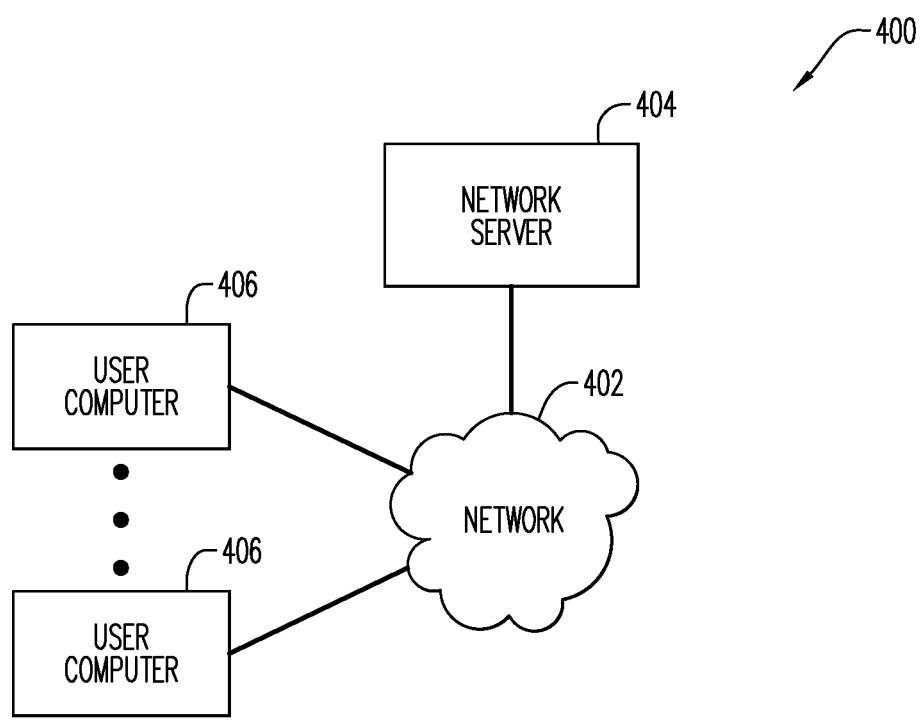
FIG. 4 is a simplified block diagram representation of a computer system and network that may be maintained by an insurance company and that may apply aspects of the present invention.

FIG. 4 is a simplified block diagram representation of an example computer system 400 and network 402 that may be maintained by one of the insurance companies 104 (FIG. 1) and that may apply aspects of the present invention.

As depicted in FIG. 4, the computer system 400 includes a network server computer 404 and user computers (e.g., personal computers) 406, all connected to the network 402. The network 402 may be a conventional corporate data communication network, and the network server computer 404 and user computers 406 may all be conventional in their hardware aspects, and may operate generally in accordance with conventional principles, but may further be operated to allow for access by employees of the insurance company to the central driver rating agency 102, the driver rating agency computer 301 and the driver score database 210.

Figure 5:
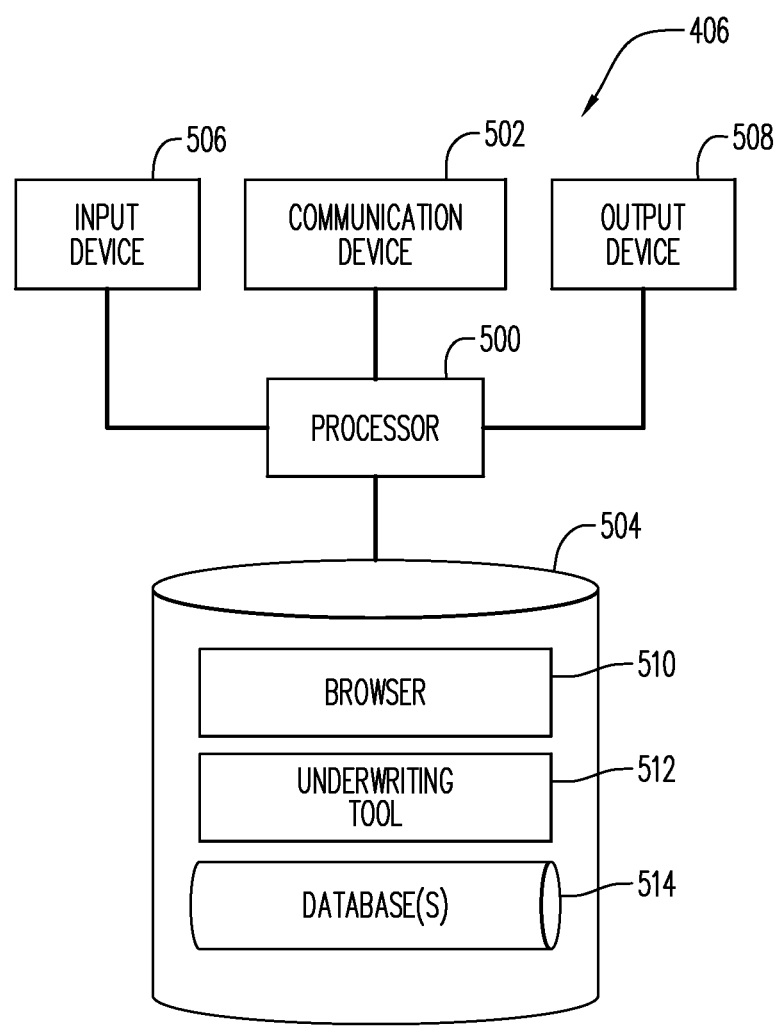
FIG. 5 is a block diagram representation of a computer that may form part of the system of FIG. 4.

FIG. 5 is a block diagram representation of a typical one of the user computers 406, and in particular a user computer assigned for use by an employee of the insurance company who is involved with underwriting motor vehicle insurance policies for commercial vehicles and/or fleets of commercial vehicles.

As depicted, the user computer 406 shown in FIG. 5 includes a computer processor 500 operatively coupled to a communication device 502, a storage device 504, one or more input devices 506 and one or more output devices 508.

Communication device 502 may be used to facilitate communication with, for example, other devices (such as the driver rating agency computer 301 and/or other user computers). Continuing to refer to FIG. 5, the input device(s) 506 may comprise, for example, a keyboard, a keypad, a mouse or other pointing device, a microphone, knob or a switch, an infra-red (IR) port, a docking station, and/or a touch screen. The input device(s) 506 may be used, for example, to enter information. Output device(s) 508 may comprise, for example, a display (e.g., a display screen), a speaker, and/or a printer.

Storage device 504 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. At least some of these devices may be considered computer-readable storage media, or may include such media.

In some embodiments, the hardware aspects of the user computer 406 may be entirely conventional.

Storage device 504 stores one or more programs or portions of programs (at least some of which being indicated by blocks 510 and 512) for controlling processor 500. Processor 500 performs instructions of the programs, and at least as a result of interaction with the driver rating agency computer 301 may operate in accordance with aspects of the present invention. In some embodiments, the programs may include a conventional web browser program 510. In accordance with conventional principles, the browser 510 allows the user computer 406 to interact with web server computers, of which the driver rating agency computer 301 may be one.

Another program or program module stored on the storage device 504 is indicated at block 512 and is operative to program the user computer 406 to aid a user of the user computer 406 in making underwriting determinations. In some embodiments, the underwriting tool program/program module 512 may include features that support consideration of a comprehensive driver score, such as described above, in connection with vehicle insurance policy underwriting decisions.

There may also be stored in the storage device 504 other software, such as one or more conventional operating systems, device drivers, communications software, etc.

Still further, the storage device 504 may store one or more other databases used by the user computer 406. Such databases are illustrated in FIG. 5 as block 514.

Figure 6:
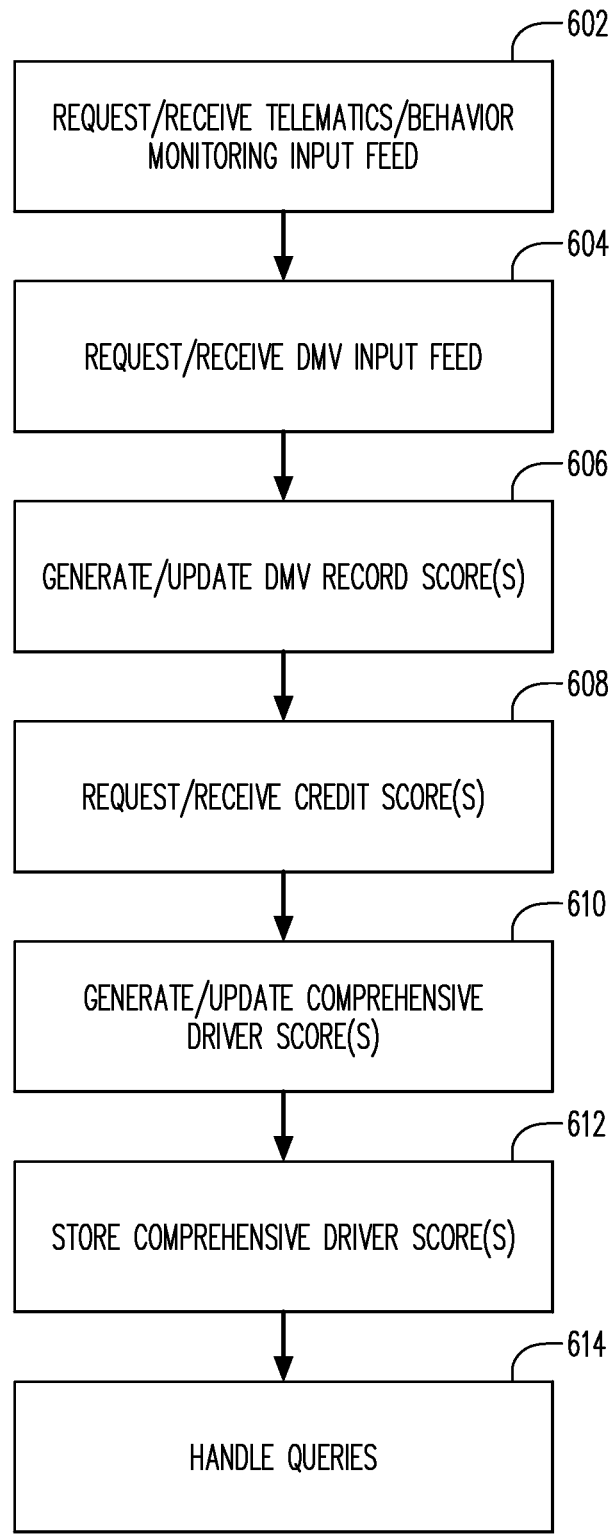
FIG. 6 is a flow chart that illustrates a process that may be performed in accordance with aspects of the present invention by the computer depicted in FIG. 3.

FIG. 6 is a flow chart that illustrates a process that may be performed in accordance with aspects of the present invention by the driver rating agency computer 301 depicted in FIG. 3.

At 602 in FIG. 6, the driver rating agency computer 301 requests from the telematics/driver behavior monitoring vendor 206, and receives from the telematics/driver behavior monitoring vendor 206, a feed of data concerning driver behavior scores generated by the telematics/driver behavior monitoring vendor 206. Alternatively, the driver rating agency computer 301 may receive such a data feed from the telematics/driver behavior monitoring vendor 206 without requesting it. In some embodiments, the data feed contains only updates of driver behavior scores that have changed, or that have changed by more than a threshold amount, in addition to driver behavior scores for drivers that are being added to the driver score database 210 (FIG. 2). In other embodiments, the data feed from the telematics/driver behavior monitoring vendor 206 to the driver rating agency computer 301 includes all current driver behavior scores as currently calculated by the telematics/driver behavior monitoring vendor 206. In still other embodiments, the telematics/driver behavior monitoring vendor 206 provides to the driver rating agency computer 301 raw or partially processed data from which the driver rating agency computer 301 may calculate a driver behavior score.

At 604 in FIG. 6, the driver rating agency computer 301 requests from the source 204 of DMV data, and receives from the source 204, a data update feed relating to moving violations of record with DMVs. Alternatively, the source 204 may supply such data without the driver rating agency computer 301 requesting the data. As noted above, the data may also reflect accidents in which the drivers were involved.

At 606, the driver rating agency computer 301 calculates and/or updates the public record driving scores of the relevant drivers in view of the data received at 604.

There are a number of different ways in which the public record driving scores may be calculated. According to some embodiments, the driver rating agency computer 301 may utilize a technique that involves a Bayesian Belief Network.

A Bayesian Belief Network is a probabilistic graphical model that represents a set of variables and their probabilistic independencies. In this case, the Bayesian network could represent the probabilistic relationships between driver attributes and risk of being at fault in a motor vehicle accident.

Figure 6A:
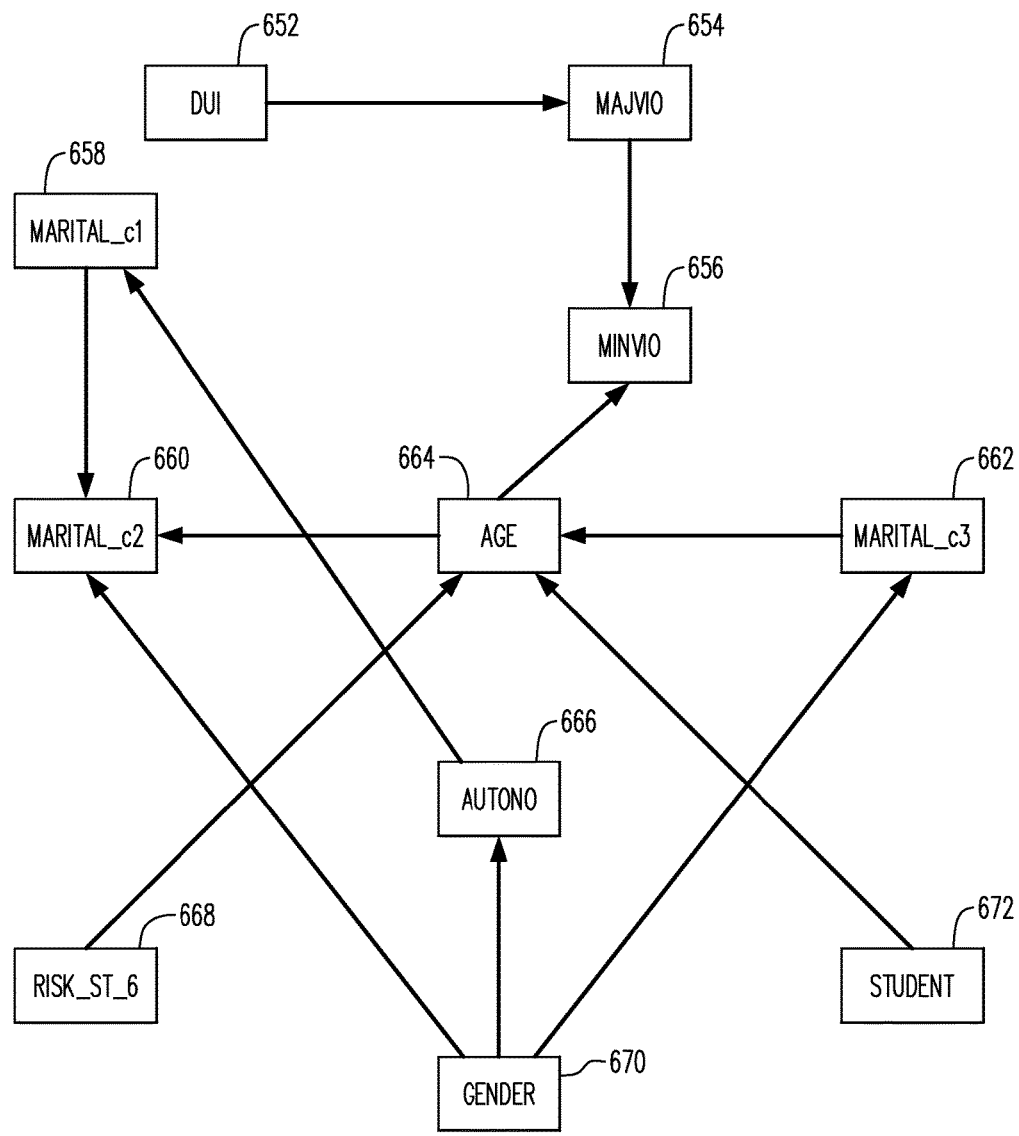
FIG. 6A shows an example Bayesian Belief Network topology that may be employed in connection with the process of FIG. 6.

The Bayesian Belief Network may be developed by applying machine learning techniques to a historical dataset of driver attributes, including their likelihood of being at fault in a motor vehicle accident. FIG. 6A shows an example Bayesian Belief Network topology that may be developed in such a learning process.

In FIG. 6A, node 652 represents a variable that indicates whether the driver has been convicted for driving under the influence of alcohol. Node 654 represents a variable that indicates whether the driver has been convicted of a major moving violation. Node 656 represents a variable that indicates whether the driver has been convicted of a minor moving violation. Nodes 658-662 represent variables that may be used to represent, via binary encoding, a driver's marital status. Node 664 represents a variable that indicates the driver's age. Node 666 represents a variable that indicates the identification number of the driver's automobile. Node 668 represents a variable that represents a risk status for the driver. Node 670 represents a variable that indicates the driver's gender. Node 672 represents a variable that indicates whether the driver is a student.

When the data indicative of the current driver's attributes is applied to this topology, a probabilistic score may be calculated that indicates the likelihood that the current driver will be involved in a motor vehicle accident and will be at fault in causing the accident.

The example topology of FIG. 6A is only one of numerous Bayesian Belief Network topologies that may be employed in alternative embodiments of the invention.

At 608, the driver rating agency computer 301 requests from the source 208 of financial condition data, and receives from the source 208, a data update feed relating to the financial condition of the drivers included or to be included in the database 210. Alternatively, the source 208 may supply the financial condition data without receiving a request from the driver rating agency computer 301. In some embodiments, the data update feed from the source 208 may indicate only changes in financial condition, or changes by more than a threshold amount, in addition to financial condition data for drivers that are to be newly added to the driver score database 210. In other embodiments, the data update feed from the source 208 includes financial condition data for all drivers included or to be included in the driver score database 210.

At 610, the driver rating agency computer 301 calculates and/or updates comprehensive driver scores for all of the drivers in the driver score database 210 and/or for drivers to be newly added to the driver score database 210. Alternatively, the driver rating agency computer 301 only calculates comprehensive driver scores for new additions to the database and updated comprehensive driver scores for drivers for whom new or updated data is included in the feeds from sources 204, 206, 208. In some embodiments, an updated comprehensive driver score may reflect both a previous comprehensive driver score and any new and relevant information received at 602, 604 and/or 608.

In some embodiments, the comprehensive driver score may be a probability that the driver will be at fault in a motor vehicle accident. The probability may be generated by using a Bayesian Belief Network akin to the topology illustrated in FIG. 6A. However, the Bayesian Belief Network topology used for generating the comprehensive driver score may have at least some other and/or different nodes from those shown in FIG. 6A.

At 612, the driver rating agency computer 301 stores the newly calculated and/or updated comprehensive driver scores in the driver score database 210. This step may also include other updates to the database 210, including for example changes in the drivers' residence addresses, and addition of new drivers to the database 210.

At 614, the driver rating agency computer 301 responds to queries that request the current comprehensive driver score for one or more drivers. As indicated above, these queries may originate from insurance companies in connection with underwriting decisions to be made by the insurance companies.

At least some of the steps illustrated in FIG. 6, such as steps 602-612, may be performed on a batch basis. For example, the data feeds discussed in connection with steps 602, 604 and 608 may be batch feeds. Most if not all of the steps illustrated in FIG. 6 may be performed with cyclical timing and/or with overlapping timings.

The driver rating agency computer 301 may also support a process or step, which is not shown, whereby a driver included in the driver score database 210 may challenge and correct alleged errors in his/her score.

Figure 7:
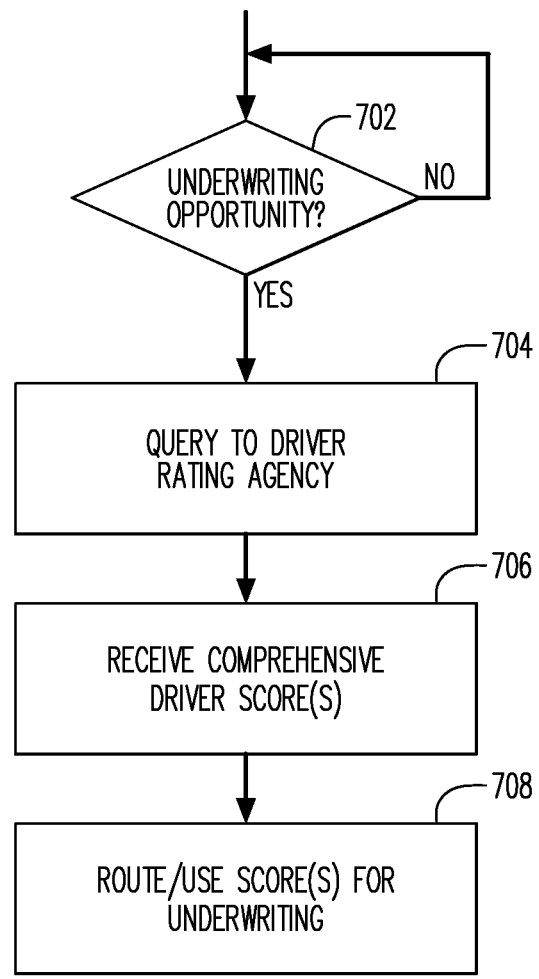
FIG. 7 is a flow chart that illustrates a process that may be performed in accordance with aspects of the present invention using the insurance company computer system of FIGS. 4 and 5.

FIG. 7 is a flow chart that illustrates a process that may be performed by an insurance company in accordance with aspects of the present invention using the computer system 400 and network 402 of FIG. 4 and/or the user computer 406 of FIG. 5.

The process of FIG. 7 is launched in response to a positive determination at decision block 702. Decision block 702 determines whether there is an opportunity for the insurance company to underwrite a policy on a commercial vehicle or fleet of vehicles. In the event of a positive determination at 702, step 704 follows. (In the event of a negative determination, the process idles at 702.)

At 704, the browser 510 of the user computer 406 accesses a website (not separately represented) that is hosted by the driver rating agency computer 301. It will be appreciated that the process may also entail exchange or transit of data via the network 402 and the network server 404, both shown in FIG. 4. As part of accessing the driver rating website, the user of the computer 406 may request that the driver rating agency computer 301 transmit the current comprehensive driver score for one or more drivers to be covered by an insurance policy to be underwritten by the insurance company that employs the user of computer 406.

At 706, the user computer 406 receives the requested comprehensive driver score(s). Again this may occur via the network 402 and the network server 404, which may route the comprehensive driver score(s) to the user computer 402.

In some embodiments, the user computer 406 may be operated by an administrative employee, who uses the user computer to route the comprehensive driver score(s) to another computer that is operated by an underwriter employed by the insurance company. In other embodiments, the user computer may be operated by the underwriter himself/herself, who may directly use the comprehensive driver score(s) in making or recommending an underwriting decision, as indicated at 708.

For example, an independent owner-operator of a tractor-trailer may have applied to the insurance company for a policy covering his/her rig. In such a case, the applicant's comprehensive driver score may play a large role in the underwriter's decision on whether to issue the policy and if so, on what terms. The insurance company may, for example, offer premium discounts for owner-operators who have a comprehensive driver score above a certain threshold. Independent owner-operators may have an incentive to have telematics equipment and sensors installed in their rigs, and to contract with the telematics/driver behavior monitoring vendor 206 to have the telematics/driver behavior monitoring vendor 206 monitor their driving behavior, so that the owner-operators can be rated by the central driver rating agency 102 and obtain benefits from having a comprehensive driver score from the central driver rating agency 102. As indicated above, such benefits may include premium discounts from insurance companies, and using the comprehensive driver score as a professional credential that may appeal to prospective employers.

To shift the focus of the discussion a bit, the comprehensive driver scores may also play a role in underwriting of vehicle fleet policies. For example, insurance companies may extend fleet policy premium discounts or offer other incentives to fleet operators who maintain certain standards for comprehensive driver scores for their employee/contractor drivers. In some examples, a fleet operator may commit to have all (or a certain proportion, say, 80-90%) of its drivers maintain a comprehensive driver score of at least a certain level. The insurance company may underwrite a fleet policy based on such a commitment, and may audit the fleet operator's records to confirm that the fleet operator has kept its commitment. As part of such an audit, the insurance company may request that the driver rating agency computer 301 transmit current comprehensive driver scores for at least some of the fleet operator's drivers to confirm that the comprehensive driver scores are what the fleet operator believes them to be.

Figure 8:
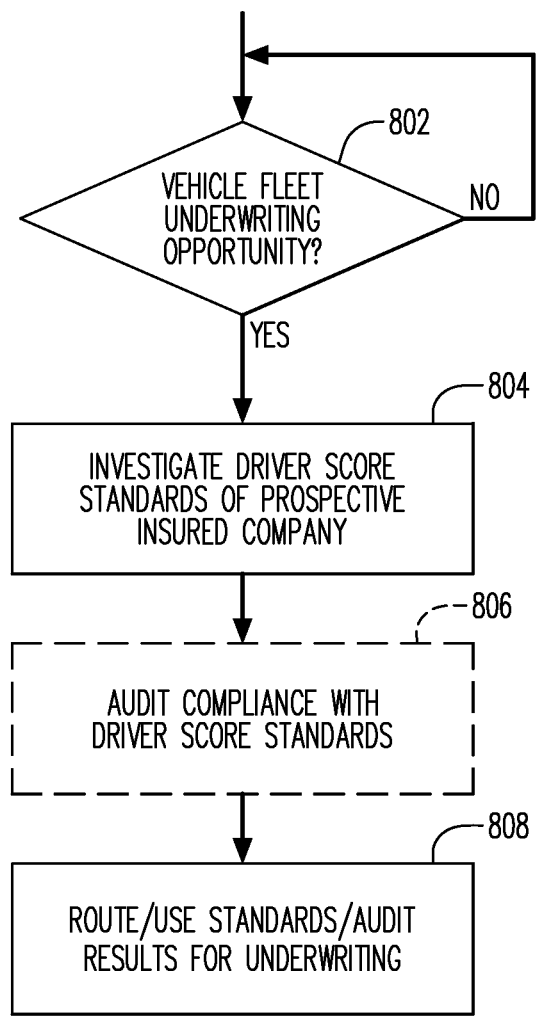
FIG. 8 is a flow chart that illustrates a process that may be performed by an insurance company in accordance with further aspects of the present invention.

A more specific example of a fleet policy underwriting process is illustrated in FIG. 8. The process may be launched by a positive determination at decision block 802 to the effect that there is an opportunity to underwrite a vehicle fleet policy. (The process may idle in the event of a negative determination at 802.) In the case of such a positive determination, block 804 follows decision block 802. At block 804, the underwriter may investigate the prospective insured company's standards for the comprehensive driver scores to be maintained by its drivers. If deemed necessary, block 806 may follow, at which the underwriter audits the prospective insured company's compliance with its standards. The standards and/or audit results may, at 808, be routed or used for making an underwriting decision.

As can be understood from the foregoing, in a fleet environment, comprehensive driver scores, which may reflect a driver's record and/or driving behavior over a period of years, and may be generated, stored and disseminated by a trusted, recognized source, may serve as useful tools for loss prevention, management of driving personnel, and for underwriting purposes.

There will now be provided a more detailed example of a comprehensive driver score in accordance with aspects of the present invention.

FIG. 9 is an example screen display or printout of a driver/driver-score profile that may be provided by the driver rating agency 102 (FIG. 1) in response to an inquiry from an insurance company 104 or a fleet operator 106.

In FIG. 9, the overall driver score is indicated at 902 and 904. In this example, the overall driver score is calculated by summing the following subscores: a safety subscore (reference numeral 906), a maintenance subscore (reference numeral 908), an efficiency subscore (reference numeral 910), and a driver professional profile subscore (reference numeral 912).

Each of the subscores may, for example, be calculated as the weighted sum of constituent factors. The value of each factor may, for example, be selected as an integer in a scale from 1 to 3, or 1 to 4, or 1 to 5.

For example, the constituent factors for the safety subscore may be driver behaviors and/or external factors related to speeding, hard braking, hard acceleration, cornering fast, seat belt use, curb jumping, lateral movement, radio volume, electronic device use, additional occupants, weather conditions, time of day, and/or load weight.

The constituent factors for the maintenance subscore may be tire pressure, fluids, engine temperature, emissions, drive train vibration, filters and/or fuel.

The constituent factors for the efficiency subscore may be hard braking, hard acceleration, miles per gallon, revolutions per minute, idle time, age of vehicle, hours driving and/or mileage driven.

Some or all of the necessary information for determining the constituent factors for these three subscores may be gathered telematically from sensors installed in the vehicle.

The constituent factors for the driver professional profile subscore may be age, gender, how long the driver has held a professional driver license, moving violations, at-fault accidents, type of driving (e.g., long haul vs. short haul), driver training and other professional credentials and/or credit rating. At least some of the information for determining these factors may be received from outside sources such as state departments of motor vehicles and a credit rating agency.

In another alternative embodiment, a Markov Random Field is employed to generate scores based on driver behavior data that is gathered telematically. In this embodiment a feature vector is defined as $$<\Delta\theta_r(1), \Delta\theta_r(2), \ldots, \Delta\theta_r(n), r_r(1), r_r(2), \ldots, r_r(n),$$
$$speed_r(1), speed_r(2), \ldots, speed_r(n), claim\_rate (id)>$$

where
$\Delta lon_r(k) = $ longitude $(t+k) - $ longitude$(t)$
$\Delta lat_r(k) = $ latitude $(t+k) - $ latitude$(t)$
$speed_r(k) = speed(t+k) - speed(t)$
$\theta_r(k) = \tan^{-1}(\Delta lat_r(k)/\Delta lon_r(k))$ [it $\Delta lon_r(k) \neq 0$, else $\infty$]
$\Delta\theta_r(k) = \theta_r(k) - \theta_r(1)$
$r_r(k) = sqrt(\Delta lon(k)^2 + \Delta lat(k)^2)$
f=frequency of GPS signal received telematically.

The parameter n is generalized to obtain a 7 dimensional Markov Random Field with transition (conditional) probability distribution function (pdf)

$$f(\Delta r_r(n), \Delta\theta_r(n), s', k' | \Delta\theta_r(1), \Delta r_r(n), s, k).$$

This pdf represents the probability of traveling at a speed of s' at point (r',θ') at k seconds after traveling at a speed of s at point (r,θ). The feature vector contains the parameters of the Markov Random Field.

The Markov Random Field may be employed to detect patterns in driver behavior, measured telematically by changes in heading and location, where the patterns are statistically associated with a likelihood to have to produce an insurance claim or not to produce an insurance claim. This pattern matching approach requires no assumptions about or analysis of driver behavior and also does not require generating and tabulating factor scores.

Up to this point, the invention has been described primarily in the context of commercial vehicles, and particularly with respect to motor-freight vehicles or fleets. Nevertheless, the invention can also be readily applied in the context of other types of commercial vehicles, such as buses, taxis, limousines and tow trucks. Moreover, in some embodiments non-professional drivers may be telematically tracked and rated, and underwriting of personal vehicle insurance policies may be at least partially based on such ratings. As in previous examples, the rating of non-professional drivers may be by a central, well-recognized rating agency.

Still further, vehicle operators other than motor vehicle operators may be telematically tracked and rated, for insurance underwriting and other purposes. For example, the invention may also be applied with respect to aircraft pilots and/or ship or boat captains and pilots.

As used herein and in the appended claims, a driving record may refer to any one or more of DMV moving violation records, accident records and measured or detected driving behavior. The term "vehicle operating record" includes a driving record.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computerized method for defining distilled portable driver scores using staged Bayesian belief networks and telematics data comprising:

transmitting, by a driver rating computer system communication device coupled to a driver rating computer system, to a driving behavior vendor computer system, a request for driving behavior scores data based on vehicle sensor telematics data corresponding to a plurality of drivers generated by one or more sensors installed in vehicles of the plurality of drivers, wherein each driving behavior score is based on the vehicle sensor telematics data corresponding to each of the plurality of drivers;

receiving, by the driver rating computer system communication device from the driving behavior vendor computer system, the driving behavior scores data corresponding to the plurality of drivers;

transmitting, by the driver rating computer system communication device to a credit bureau computer system, a request for credit scores data corresponding to the plurality of drivers;

receiving, by the driver rating computer system communication device from the credit bureau computer system, the credit scores data corresponding to each of the plurality of drivers;

transmitting, by the driver rating computer system communication device to a plurality of department of motor vehicle (DMV) computer systems, requests for moving violations data corresponding to each of the plurality of drivers;

receiving, by the driver rating computer system communications device from the plurality of department of motor vehicle (DMV) computer systems, the moving violations data corresponding to each of the plurality of drivers;

applying, the moving violations data corresponding to each of the plurality of drivers to a first Bayesian belief network stored on the driver rating computer system;

generating, by the driver rating computer system based on application of the moving violations data corresponding to each of the plurality of drivers to the first Bayesian belief network, public record score data for each of the plurality of drivers;

applying, by the driver rating computer system, the driver behavior scores data, the credit scores data, and the public record scores data generated by the first Bayesian belief network, to a second Bayesian belief network store on the driver rating computer system;

generating, by the driver rating computer system based on application of the driver behavior scores data, the credit scores data, and the public record scores data generated by the first Bayesian belief network, to the second Bayesian belief network, distilled portable combined driver score data comprising a professional credential for each of the plurality of drivers;

storing, by the driver rating computer system, the portable combined driver score data generated by the staged Bayesian belief networks for each of the plurality of drivers in a driver rating computer system computerized database;

receiving, by the driver rating computer system communication device from one of an insurance company computer system and a fleet operator computer system, a query for distilled portable combined driver score data for a particular driver; and responsive to receipt of the query, transmitting by the driver rating computer system communication device to the one of the insurance company computer system and the fleet operator computer system, the distilled portable combined driver score data generated by the staged Bayesian belief networks for the particular driver.

2. The computerized method of claim 1, wherein said driver behavior score data corresponds to the driver's driving practices over a period of at least two years.

3. The computerized method of claim 1, wherein said driver behavior score data corresponds to the driver's driving practices over a period of at least five years.

4. The computerized method of claim 1, wherein said vehicle sensor telematics data being generated by the one or more sensors comprises the one or more sensors being configured to detect at least one of excessive speed, hard braking, and excessive acceleration.

5. A computerized method defining distilled portable driver scores using staged Bayesian belief networks and telematics data comprising:

transmitting, by a driver rating computer system communication device coupled to a driver rating computer system, to a driving behavior vendor computer system, a request for driving behavior scores data based on vehicle sensor telematics data corresponding to a plurality of drivers generated by one or more sensors installed in vehicles of the plurality of drivers;

receiving, by the driver rating computer system communication device from the driving behavior vendor computer system, the driving behavior scores data based on vehicle sensor telematics data corresponding to the plurality of drivers;

transmitting, by the driver rating computer system communication device from to a credit bureau computer system, a request for credit scores data corresponding to the plurality of drivers;

receiving, by the driver rating computer system communication device from the credit bureau computer system, the credit scores data corresponding to each of the plurality of drivers;

transmitting, by the driver rating computer system communication device to a plurality of department of motor vehicle computer systems, a request for moving violations data corresponding to each of the plurality of drivers;

receiving, by the driver rating computer system communications device from the plurality of department of motor vehicle computer systems, the moving violations data corresponding to each of the plurality of drivers;

applying the moving violations data corresponding to each of the plurality of drivers to a first Bayesian belief network accessible by the driver rating computer system;

generating, by the driver rating computer system based on application of the moving violations data corresponding to each of the plurality of drivers to the first Bayesian belief network, public record score data for each of the plurality of drivers;
applying, by the driver rating computer processor, the driver behavior scores data, the credit scores data, and the public record scores data generated by the first Bayesian belief network, to a second Bayesian belief network accessible by the driver rating computer system;
generating, by the driver rating computer system based on application of the driver behavior scores data, the credit scores data, and the public record scores data generated by the first Bayesian belief network, to the second Bayesian belief network, distilled portable combined driver score data comprising a professional credential for each of the plurality of drivers;
storing the portable combined score data generated by the staged Bayesian belief networks for each of the plurality of drivers in a computerized database;
receiving, by the driver rating computer system communication device from an insurance company computer system, a request for the portable combined driver score data for a driver; and
responsive to the receipt of the request, transmitting, by the driver rating computer system communication device to the insurance company computer system, driver score profile data including the portable combined score data generated by the staged Bayesian belief networks for the driver.

6. A telematics based computer system for generating distilled portable driver scores using staged Bayesian belief networks, comprising:
a data storage device storing a first Bayesian belief network and a second Bayesian belief network;
a first computer processor in communication with the data storage device;
a communication device; and
a first program memory, coupled to the first computer processor, storing program instruction steps for execution by the first computer processor, the first computer processor operative pursuant to the stored program instruction steps to:
transmit, by the communication device to a driving behavior vendor computer system, a request for driving behavior scores data based on vehicle sensor telematics data corresponding to a plurality of drivers generated by one or more sensors installed in vehicles of the plurality of drivers, wherein each driving behavior score is based on vehicle sensor telematics data corresponding to each of the plurality of drivers;
receive, by the communication device from the driving behavior vendor computer system, the driving behavior scores data corresponding to the plurality of drivers;
transmit, by the communication device to a credit bureau computer system, a request for credit scores data corresponding to the plurality of drivers;
receive, by the communication device from the credit bureau computer system, the credit scores data corresponding to each of the plurality of drivers;
transmit, by the communication device to a plurality of department of motor vehicle computer systems, a request for moving violations data corresponding to each of the plurality of drivers;
receive, by the communications device from the plurality of department of motor vehicle computer systems, the moving violations data corresponding to each of the plurality of drivers;
apply the moving violations data corresponding to each of the plurality of drivers to the first Bayesian belief network stored on the data storage device;
generate, based on application of the moving violations data corresponding to each of the plurality of drivers to the first Bayesian belief network, public record score data for each of the plurality of drivers;
apply the driver behavior scores data, the credit scores data, and the public record scores data generated by the first Bayesian belief network, to the second Bayesian belief network stored on the data storage device;
generate, based on application of the driver behavior scores data, the credit scores data, and the public record scores data generated by the first Bayesian belief network, to the second Bayesian belief network stored on the data storage device, distilled portable combined driver score data for each of the plurality of drivers comprising a professional credential for each of the plurality of drivers; and
store the portable combined score data generated by the staged Bayesian belief networks for each of the plurality of drivers in the data storage device.

7. The telematics based computer system of claim 6, wherein the first computer processor is further operative pursuant to the stored program instruction steps to:
receive, by the communication device, electronic queries from external computer systems; and
transmit, by the communication device responsive to receipt of the electronic queries, portable combined driver scores data for drivers to said external computer systems.

8. The telematics based computer system of claim 6, wherein the first computer processor is further operative pursuant to the stored program instruction steps to:
transmit, by the communication device to an owner-operator computer system, data indicative of an offer of a discount for having a portable combined driver score above a predetermined threshold; and
transmit, by the communication device to a fleet computer system, data indicative of an offer of a discount to a fleet operator who commits to having a predetermined percentage of their fleet drivers maintain a portable combined driver score of at least a predetermined level.

9. The computerized method of claim 1, further comprising:
transmitting, by the communication device to an owner-operator computer system, data indicative of an offer of a discount for having a portable combined driver score above a predetermined threshold; and
transmitting, by the communication device to a fleet operator computer system, data indicative of an offer of a discount to a fleet operator who commits to having a predetermined percentage of their fleet drivers maintain a portable combined driver score of at least a predetermined level.

10. The computerized method of claim 5, further comprising:
transmitting, by the communication device to an owner-operator computer system, data indicative of an offer of a discount for having a portable combined driver score above a predetermined threshold; and transmitting, by the communication device to a fleet operator computer system, an offer of a discount to a fleet operator who commits to having a predetermined percentage of their fleet drivers maintain a portable combined driver score of at least a predetermined level.

11. The computerized method of claim 1, further comprising transmitting, by the communication device to a fleet operator computer system, data indicative of an offer of a discount to fleet operators who maintain standards requiring employee drivers to have a portable combined score above a predetermined threshold.

12. The computerized method of claim 11, wherein the data indicative of offer provides that at least eighty percent of the employee drivers are required to maintain a portable combined score above the predetermined threshold.

13. The computerized method of claim 5, further comprising transmitting, by the communication device to a fleet operator computer system, data indicative of an offer of a discount to fleet operators who maintain standards requiring employee drivers to have a portable combined score above a predetermined threshold.

14. The computerized method of claim 13, wherein the data indicative of the offer provides that at least eighty percent of the employee drivers are required to maintain a portable combined score above the predetermined threshold.

15. The telematics based computer system of claim 6, wherein the first computer processor is further operative pursuant to the stored program instruction steps to transmit, by the communication device to a fleet operator computer system, data indicative of an offer of a discount to fleet operators who maintain standards requiring employee drivers to have a portable combined score above a predetermined threshold.

16. The telematics based computer system of claim 15, wherein the first computer processor is further operative pursuant to the stored program instruction steps to transmit, by the communication device to a fleet operator computer system, data indicative of an offer of the discount to fleet operators when at least eighty percent of the employee drivers are required to maintain a portable combined score above the predetermined threshold.

17. The computerized method of claim 1, wherein the first Bayesian belief network includes a first node representing a variable corresponding to whether the driver for whom the public record score is being determined has been convicted of a major moving violation, and a second node representing a variable corresponding to whether the driver for whom the public record score is being determined has been convicted of a minor moving violation.

18. The computerized method of claim 17, wherein the first Bayesian belief network further includes a third node representing a variable corresponding to a marital status of the driver for whom the public record score is being determined, a fourth node representing a variable corresponding to an identification number of the automobile of the driver for whom the public record score is being determined, a fifth node representing a variable corresponding to a risk status of the driver for whom the public record score is being determined, a sixth node representing a variable corresponding to a gender of the driver for whom the public record score is being determined, and a seventh node representing a variable corresponding to whether the driver for whom the public record score is being determined is a student.

19. The computerized method of claim 17, wherein the first Bayesian belief network further includes a third node representing a variable corresponding to one of a marital status of the driver for whom the public record score is being determined, an identification number of the automobile of the driver for whom the public record score is being determined, a risk status of the driver for whom the public record score is being determined, a gender of the driver for whom the public record score is being determined, and whether the driver for whom the public record score is being determined is a student.

* * * * *